United States Patent Office 3,030,380
Patented Apr. 17, 1962

3,030,380
PROCESS FOR PREPARING OPTICALLY ACTIVE AMINO ACIDS FROM PROTEIN HYDROLYSATES
Friedrich Weygand, Berlin-Frohnau, and Rudolf Geiger, Frankfurt am Main, Germany, assignors to Farbwerke Hoechst Aktiengesellschaft vormals Meister Lucius & Brüning, Frankfurt am Main, Germany, a corporation of Germany
No Drawing. Filed Apr. 1, 1958, Ser. No. 725,492
Claims priority, application Germany Apr. 6, 1957
7 Claims. (Cl. 260—326.3)

The present invention relates to a new process for preparing optically active amino acids from protein hydrolysates with the use of amino esters substituted at the nitrogen atom by trifluoracetic acid.

It is already known to isolate from protein hydrolysates sparingly soluble amino acids such as cystine and tryosine by adjusting the hydrolysate solution to the isoelectric point. It is also known to separate amino esters by fractional distillation. This method, however, is not satisfactory because amino esters, which condense to dioxo piperazines even at low temperatures, do so at increased rates when heated for distillation. Fractional distillation of the N-acylamino acid esters under reduced pressure has likewise been suggested. However, when the products obtained in this way are to be transformed into the free amino acids, high losses occur, since it is difficult to split off the N-acyl radical.

Now we have found a process for separating optically active amino acids from protein hydrolysates by esterifying the protein hydrolysate with monohydric alcohols containing 1–4 carbon atoms and converting the mixture of amino esters thus obtained into the N-trifluoracetylamino acid esters and by subjecting those portions of the reaction mixture that are insoluble in water to fractional distillation under reduced pressure.

By starting from the individual fractions thus prepared, solutions are obtained, by hydrolysis with dilute alkaline agents and subsequent acidification to the isoelectric point, from which the free amino acids, as far as they do not precipitate in view of their being sparingly soluble, are obtained by evaporation or precipitation with water-soluble alcohols.

For esterifying the protein hydrolysates there can be used aliphatic alcohols of low molecular weight containing 1–4 carbon atoms, especially methanol or ethanol. Methanol is preferably used since the methyl esters of the compounds of N-trifluoracetylamino acid prepared therefrom show a particularly low boiling point. The mixture of amino acids is esterified in the usual manner by heating with an excess of alcohol and applying as catalyst a string acid, for instance hydrochloric acid. Any other usual method of esterifying amino acids can be applied with the same success. When removing the solvent by means of evaporation a mixture of the amino acid ester salts is obtained in solid form.

The conversion into the derivatives of trifluoracetic acid is carried out with a trifluoracetic acid ester and a tertiary amine. For this reaction the three reactants can be applied in any desired succession and in equimolecular amounts. The reaction is performed with spontaneous heating without addition of external heat. In order to delay the reaction it is possible to cool so that the reaction can be performed in a temperature range between 0° C. and 20° C. In order to accelerate the reaction it is possible to heat in addition, for instance from 20° C. to 50° C. When operating above 50° C., for instance between 70° C. and 100° C. it is necessary to work under pressure in order to prevent the reactants from distilling off. Operation in a temperature range between 20° C. and 50° C. is most suitable, this range being automatically given by the reaction heat. The mixture of amino acid ester salts is preferably suspended in chloroform or dissolved in methanol, a trifluoracetic acid ester of an aliphatic alcohol containing 1–4 carbon atoms, preferably the trifluoracetic acid methyl ester is then added, in an excess of 0.01–10 mols, preferably 0.1–1 mol, and a tertiary amine, for example triethylamine, pyridine, N-ethylpiperidine is then added in an excess of 0.01–10 mols, preferably 0.1–1.5 mols, in several portions with cooling under reflux and stirring. After completion of the reaction the solvents and excessive liquid reactants are distilled off. The residue is distributed in a process comprising one or several stages among water and an organic solvent not miscible with water, for instance benzene, chloroform, methylene chloride or carbon tetrachloride. As organic solvent there are particularly suitable benzene and chloroform. The distribution is favorably carried out in 5 stages. Thereby, the N-trifluoracetylamino acid esters of arginine, histidine and of the hydroxy-amino acids, a small portion of trifluoracetamide, in addition to triethylaminohydrochloride are going over into the aqueous phase. From the aqueous phase the N-trifluoracetylamino acid esters can be eliminated by means of ether, and they can be separated according to known methods after distilling off the ether.

The solvent is removed from the organic phase containing the remaining N-trifluoracetylamino acid ester sparingly soluble in water, and the residue is subjected to fractional distillation under reduced pressure.

The individual fractions are treated at 0° C.–30° C. with dilute inorganic bases, for example lithium hydroxide, sodium hydroxide, potassium hydroxide or barium hydroxide. The reaction can be accelerated by heating to 30° C.–100° C., preferably 40° C.–70° C. Subsequently the fractions are acidified to the isoelectric point by means of low molecular organic acids containing 1–3 carbon atoms, preferably acetic acid; when lithium hydroxide is used as hydrolyzing agent also by means of hydrochloric acid, when barium hydroxide is used by means of sulfuric acid. According to their constitution the amino acids are thereby directly precipitated or separated off by evaporation or by means of alcohols miscible with water.

It is of special advantage that derivatives of N-trifluoracetylamino acid esters which are often used for peptide syntheses can be obtained in a very simple manner. Thus, by splitting off the N-trifluoracetyl group and the alcohol group by means of dilute bases, free amino acids are obtained which can subsequently be reacted with carbobenzoxychloride in order to obtain N-carbobenzoxyamino acids or with trifluoracetic acid thioethyl ester, already in the aqueous medium, in order to obtain N-trifluoracetylamino acids, without a necessity of primarily isolating the free amino acids. Furthermore, amino acid ester hydrochlorides can easily be obtained from N-trifluoracetylamino acid esters by treatment in the heat with a mixture of alcohol and hydrochloric acid, with splitting off of the trifluoracetyl group.

According to the composition of the protein used for hydrolysis it may be suitable primarily to separate the hydrochloride of the glutamic acid by means of hydrochloric acid and to precipitate the sparingly soluble amino acids, cystine and tryosine, at the isoelectric point. It may likewise be favorable to divide, at first with the aid of suitable ion exchangers, the protein hydrolysate into basic, acid and neutral amino acids and to apply only then the process described to the separation of the neutral amino acids.

The process according to the invention, in view of the low boiling points of the N-trifluoracetyl derivatives of the amino acid esters, facilitates splitting protein hydrolysates into individual amino acids in an excellent yield and with maintenance of the optical activity. Furthermore, the N-trifluoroacetyl derivatives, in view of the surprising fact that the N-trifluoroacetyl-group can easily be split off by means of dilute inorganic bases already at room temperature, make possible the preparation of free, pure amino acids in an excellent yield. The amino acids can be used for synthetic and pharmaceutic preparations. The following examples serve to illustrate the invention but they are not intended to limit it thereto:

Example 1

A hydrolysate containing 14.2% of water, obtained by heating 1 kilogram of gelatine with hydrochloric acid and evaporation under vacuum, is twice heated for 2 hours under reflux with 6 liters of methanol, while dry hydrogen chloride is introduced. After distilling off the methanol to a remaining quantity of 2 liters, the mixture is allowed to stand for about 15 hours in the refrigerator, and the glycine methylester hydrochloride (280 grams) which has separated is filtered off. The residue is dissolved in 5 liters of anhydrous chloroform and 2.3 liters of anhydrous triethylamine, 1.5 liters of trifluoracetic acid methyl ester are added, whereby spontaneous heating to about 50° C. sets in. Any loss of trifluoracetic acid methyl ester is avoided by means of a reflux cooler. After 4 hours the solvent is distilled off together with the excess trifluoracetic acid methyl ester and triethylamine. After complete elimination of chloroform and triethylamine in vacuo, the residue is distributed in 5 stages among 2 litres of benzene and water each. Thereby the N-trifluoracetylamino acid methyl esters of arginine, hydroxyproline, serine and threonine in addition to triethylamine hydrochloride and trifluoracetamide go over into the aqueous phase. The benzene phase contains the N-trifluoracetylamino acid methyl esters of the remaining amino acids. After distilling off the benzene, the residue is subjected to fractional distillation in vacuo. The various amino acid derivatives are then obtained in the following succession: alanine (80° C.), valine, glycine (94.5° C.), isoleucine, leucine, proline (103° C.), aspartic acid (117° C.), methionine, phenylalanine (135° C.), glutamic acid. The indicated temperatures were ascertained at a rotating band column of a length of 100 cm. under a pressure of 3 mm. of mercury. The residue essentially consists of bis-N.N'-trifluoroacetyl-lysine-methyl-ester which is obtained in a pure state by subsequent distillation at $10^{-2}$ mm. of mercury.

By subsequent hydrolysis with 1.5 mols of 2 N-sodium hydroxide solution at room temperature and adjusting the pH to the isoelectric point by means of glacial acetic acid the pure, optically fully active amino acids are separated off. Particularly easily soluble amino acids are precipitated by means of ethanol. Proline is most favorably obtained from N-trifluoroacetyl-proline-methyl-ester by hydrolysis with preferably 0.5 N-barium hydroxide solution, precipitation of the barium by means of sulfuric acid, centrifuging off of the barium sulfate, deacidification of the solution by means of a weakly basic ion exchanger, concentration by evaporation, taking up of the residue in alcohol and precipitation of the amino acid with ether.

The N-trifluoracetyl-methyl ester of the hydroxyamino acids, for example hydroxyproline, serine, threonine are extracted with ether from the aqueous phase obtained by the distribution among benzene and water. After distilling off the ether, alkaline hydrolysis is carried out and the hydroxyproline is subsequently isolated, for instance by conversion into the Reineckeate (cf. J. Kampfhammer and R. Eck, Hoppe Seyler's Zeitschrift f. physiol. Chemie 170, 292 (1927). After boiling for 2 hours in the presence of 2 N-hydrochloric acid, arginine is precipitated in the form of the flavianate from the extracted aqueous phase.

The yields obtained from 1 kilogram of gelatine can be seen from the following table:

| Amino acid | N-trifluor-acetyl-amino acid methyl ester in grams | corresponding amino acid in grams | Percent of dry gelatine | contained in the gelatine (percent) | Yield in percent of the theory |
|---|---|---|---|---|---|
| Alanine | 146 | 65 | 7.6 | 9.5 | 80 |
| valine | 16 | 8.2 | 0.95 | 3.4 | 24 |
| isoleucine | 9 | 4.8 | 0.56 | 1.5 | 37 |
| leucine | 32 | 17 | 2.0 | 3.5 | 57 |
| proline | 154 | 77 | 9.0 | 15.1 | 60 |
| aspartic acid | 64 | 34 | 3.9 | 6.3 | 62 |
| glutamic acid | 68 | 37 | 4.3 | 11.3 | 38 |
| methionine | 10 | 5.7 | 0.66 | 0.8 | 83 |
| phenylalanine | 12 | 7.2 | 0.84 | 2.5 | 33 |
| lysine | 60 | 24 | 2.8 | 4.1 | 68 |
| total glycine | | 187 | 21.8 | 27.3 | 80 |
| arginine (flavianate) | | 58 | 6.8 | 8.6 | 79 |
| hydroxyproline (reineckeate) | | 95 | 11.1 | 14.0 | 79 |

Example 2

800 grams of casein (content of humidity 9%) are heated for 16 hours with 1600 cc. of concentrated hydrochloric acid and 800 cc. of water under reflux. After cooling, the substance is filtered, evaporated in vacuo to about 1500 grams and 350 grams of concentrated hydrochloric acid are added. On standing in the refrigerator, glutamic acid hydrochloride crystallizes out; it is filtered off with suction, washed three times with 100 cc. of concentrated hydrochloric acid each (yield 174 grams). The filtrate is evaporated in vacuo to about 940 grams, whereby the major part of the hydrochloric acid is removed. The filtrate is then diluted by means of 200 cc. of water and the pH is adjusted to 5.4 by means of 865 cc. of sodium hydroxide solution of 20% strength. Thereby a precipitate is separated off which, after standing for 1 day in the refrigerator, is filtered off (158 grams). It essentially contains tyrosine, leucine, isoleucine, furthermore some methionine and phenylalanine. By shaking with 1 liter of acetic acid of 15% strength, all amino acids are dissolved, except tyrosine, which remains behind as a dark colored, but paperchromatographically uniform product (32.5 grams). The filtrate is evaporated in vacuo and the residue is united with the main quantity. In order to remove ammonia which has formed in the hydrolysis, the pH is adjusted to 9 by means of 190 cc. of sodium hydroxide solution of 20% strength and the mass is concentrated in vacuo, nitrogen being sucked through. Now, the mass is acidified by means of 500 cc. of concentrated hydrochloric acid in order to transform the amino acids into the hydrochlorides and the reaction mixture is evaporated to dryness under reduced pressure. 2.5 liters of methanol are added to the residue, hydrogen chloride is introduced in the heat until the syrup is completely dissolved, and only sodium chloride remains undissolved. The mixture is then boiled for 2 hours under reflux. After distilling off the methanol, the same procedure is repeated with 2.5 liters of methanol. After cooling, the sodium chloride is filtered off (253 grams), the methanol is distilled off and the residue is completely evaporated to dryness under reduced pressure. The weight of the dry product is 625 grams.

In order to transform the amino acid ester hydrochlorides thus obtained into the N-trifluoroacetyl-amino acid methyl esters, 2 liters of anhydrous chloroform or methanol are added to the latter and subsequently 645 cc. of trifluoroacetic acid methyl ester are added; 915 cc. of anhydrous triethylamine are then added in several portions while stirring, whereby the whole mass is dissolved with spontaneous heating. By means of a reflux cooler the trifluoracetic acid methyl ester is prevented from escaping. After 4 hours the reaction is finished. The solvent and the excess trifluoracetic acid methyl ester are distilled off, the last part under reduced pressure.

The above procedure is followed by a distribution in 5 stages among 1.8 liters of benzene and water each. The aqueous phase is extracted with ether. In the ether there are contained, apart from a little N-trifluoracetyl-glycine-methyl ester and a little trifluoracetamide, primarily N-trifluoracetyl methyl esters of serine and threonine. After distilling off the ether, the residue is subjected to hydrolysis by means of 0.4 N-barium hydroxide solution (1.5 mols) by allowing it to stand for about 15 hours. Barium sulfate is then precipitated by means of 1 N-sulfuric acid. After centrifuging off the barium sulfate, the liberated trifluoracetic acid is removed by means of a weakly basic ion exchanger, whereupon alcohol is added to the solution after its concentration in vacuo. A mixture of serine and threonine is precipitated.

Arginine is obtained according to the method described in Example 1. The benzene phases are combined, the benzene is distilled off and the residue is subjected to fractional distillation in vacuo.

The yields obtained from 800 grams of casein are shown in the following table:

| Amino acid | N-trifluor-acetyl-amino acid methyl ester in grams | corresponding amino acid in grams | percent of the dry casein | contained in the casein (percent) | yield percent of the theory |
| --- | --- | --- | --- | --- | --- |
| Glycine | 6.0 | 2.42 | 0.33 | 2.7 | 12 |
| alanine | 42.3 | 18.9 | 2.59 | 3.0 | 87 |
| valine | 42.6 | 22.0 | 3.02 | 7.2 | 42 |
| isoleucine | 42.1 | 22.8 | 3.14 | 6.1 | 51 |
| leucine | 64.0 | 34.7 | 4.76 | 9.2 | 52 |
| proline | 101.0 | 51.5 | 7.0 | 8.2 | 85 |
| aspartic acid | 49.4 | 25.7 | 3.53 | 7.1 | 50 |
| glutamic acid | 30.0 | | | | |
| methionine | 14.0 | 8.6 | 1.18 | 2.8 | 42 |
| phenylalanine | 30.9 | 18.5 | 2.54 | 5.0 | 51 |
| lysine | 92.0 | 38.0 | 5.2 | 8.2 | 63 |
| arginine (flavianate) | 65.5 | 19.4 | 2.66 | 4.1 | 65 |
| Glutamic acid totally | | 125.0 | 17.2 | 22.4 | 77 |
| tyrosine | | 25 | 3.44 | 6.3 | 55 |
| serine+threonine | | 14 | 1.92 | 11.1 | 17.4 |

*Example 3*

The product obtained by hydrolising 100 grams of gelatine with hydrochloric acid is diluted with water to 2 liters, neutralized by means of potassium hydroxide solution or sodium hydroxide solution of 20% strength and stirred twice for 3 hours with 150 cc. each of an ion exchanger containing sulfo groups in the K+ or Na+ form. The basic amino acids are thereby removed. The ion exchanger is filtered off, the filtrate is evaporated to dryness under reduced pressure and further worked up by esterification, trifluoracetylation, distribution among benzene and water and distillation of the N-trifluoracetyl amino acid esters in the manner described in Example 1. The yields are about the same as those obtained according to Example 1. Histidine, lysine and a small quantity of aromatic amino acids equally retained are eluted from the ion exchanger by means of dilute ammonia. Arginine is eluted by means of dilute sodium hydroxide solution. The adsorption of the basic amino acids can also be effected in a column arrangement.

*Example 4*

From a casein hydrolysate obtained by means of hydrochloric acid there are at first removed, as described in Example 2, glutamic acid and tyrosine, whereupon the basic amino acids are separated off as described in Example 3. The further treatment is carried out according to Example 2.

*Example 5*

From a hydrolysate of hairs or wool obtained by means of hydrochloric acid, glutamic acid is at first separated off in the form of the hydrochloride with the aid of hydrochloric acid. Subsequently the sparingly soluble amino acids cystine and tyrosine are precipitated at the isoelectric point and then treated according to the method described in Example 2.

We claim:

1. A process for separating optically active amino acids in the form of their N-trifluoroacetylated esters, said amino acids being derived from protein hydrolysates, which process comprises esterifying protein hydrolysates by heating with a monohydric alcohol having 1 to 4 carbon atoms in the presence of an acid catalyst, contacting the amino acid esters thus obtained with a trifluoroacetic acid ester of a monohydric alcohol having 1 to 4 carbon atoms in the presence of a hydrocarbon substituted tertiary amine as acid binding agent, whereby the corresponding N-trifluoroacetyl amino acid esters are produced, and then fractionally distilling the water-insoluble part of the reaction mixture consisting of N-trifluoroacetyl amino acid esters under reduced pressure, whereby are obtained separate ester fractions adaptable to hydrolysis to the corresponding amino acids by contact with a dilute solution of an inorganic base.

2. A process for separating optically active amino acids in the form of their N-trifluoroacetylated esters, said amino acids being derived from protein hydrolysates, which process comprises esterifying protein hydrolysates by heating with methanol in the presence of an acid catalyst, contacting the amino acid esters thus obtained with methyl trifluoroacetate in the presence of triethylamine as acid binding agent, whereby the corresponding N-trifluoroacetyl amino acid esters are produced, and then frictionally distilling the water-insoluble part of the reaction mixture consisting of N-trifluoroacetyl amino acid esters under reduced pressure, whereby are obtained separate ester fractions adaptable to hydrolysis to the corresponding amino acids by contact with a dilute solution of an inorganic base.

3. A process for separating optically active amino acids in the form of their N-trifluoroacetylated esters, said amino acids being derived from protein hydrolysates, which process comprises esterifying protein hydrolysates by heating with methanol in the presence of an acid catalyst, contacting the amino acid esters thus obtained with methyl trifluoroacetate in the presence of N-ethylpiperidine as acid binding agent, whereby the corresponding N-trifluoroacetyl amino acid esters are produced, and then fractionally distilling the water-insoluble part of the reaction mixture consisting of N-trifluoroacetyl amino acid esters under reduced pressure, whereby are obtained separate ester fractions adaptable to hydrolysis to the corresponding amino acids by contact with a dilute solution of an inorganic base.

4. A process for separating optically active amino acids in the form of their N-trifluoroacetylated esters, said amino acids being derived from protein hydrolysates, which process comprises esterifying protein hydrolysates by heating with methanol in the presence of an acid catalyst, contacting the amino acid esters thus obtained with methyl trifluoroacetate in the presence of pyridine as acid binding agent, whereby the corresponding N-trifluoroacetyl amino acid esters are produced, and then fractionally distilling the water-insoluble part of the reaction mixture consisting of N-trifluoroacetyl amino acid esters under reduced pressure, whereby are obtained separate ester fractions adaptable to hydrolysis to the corresponding amino acids by contact with a dilute solution of an inorganic base.

5. A process for separating optically active amino acids in the form of their N-trifluoroacetylated esters, said amino acids being derived from protein hydrolysates, which process comprises esterifying protein hydrolysates by heating with methanol in the presence of an acid catalyst, contacting the amino acid esters thus obtained with methyl trifluoroacetate in the presence of triethylamine as acid binding agent at temperatures between 20° and 50° C., whereby the corresponding N-trifluoroacetyl amino acid esters are produced, and then fractionally distilling the water-insoluble part of the reaction mixture consisting of N-trifluoroacetyl amino acid esters under reduced pressure, whereby are obtained separate ester fractions adaptable to hydrolysis to the corresponding amino acids by contact with a dilute solution of an inorganic base.

6. A process for separating optically active amino acids in the form of their N-trifluoroacetylated esters, said amino acids being derived from protein hydrolysates, which process comprises esterifying protein hydrolysates by heating with methanol in the presence of an acid catalyst, contacting the amino acid esters thus obtained with methyl trifluoroacetate in the presence of triethylamine as acid binding agent at temperatures between 20° and 50° C. in methanol as diluent, whereby the corresponding N-trifluoroacetyl amino acid esters are produced, and then fractionally distilling the water-insoluble part of the reaction mixture consisting of N-trifluoroacetyl amino acid esters under reduced pressure, whereby are obtained separate ester fractions adaptable to hydrolysis to the corresponding amino acids by contact with a dilute solution of an inorganic base.

7. A process for separating optically active amino acids in the form of their N-trifluoroacetylated esters, said amino acids being derived from protein hydrolysates, which process comprises esterifying protein hydrolysates by heating with methanol in the presence of an acid catalyst, contacting the amino acid esters thus obtained with methyl trifluoroacetate in the presence of triethylamine as acid binding agent at temperatures between 20° and 50° C. in chloroform as diluent, whereby the corresponding N-trifluoroacetyl amino acid esters are produced, and then fractionally distilling the water-insoluble part of the reaction mixture consisting of N-trifluoroacetyl amino acid esters under reduced pressure, whereby are obtained separate ester fractions adaptable to hydrolysis to the the corresponding amino acids by contact with a dilute solution of an inorganic base.

References Cited in the file of this patent

UNITED STATES PATENTS

| | | |
|---|---|---|
| 2,041,265 | Orthner et al. | May 19, 1936 |
| 2,460,040 | Sifferd | Jan. 25, 1949 |
| 2,681,927 | McCollum et al. | June 22, 1954 |
| 2,831,889 | Gaver et al. | Apr. 22, 1958 |